(12) United States Patent
Cheng et al.

(10) Patent No.: US 11,475,694 B2
(45) Date of Patent: Oct. 18, 2022

(54) TOUCH RECOGNITION DEVICE, DISPLAY DEVICE AND MANUFACTURING METHOD THEREOF

(71) Applicants: Reco Technology (Chengdu) Co., Ltd., Sichuan (CN); Reco Biotek Co., Ltd., Miaoli County (TW)

(72) Inventors: Li-Ting Cheng, Guangdong (CN); Shih-Chieh Huang, Guangdong (CN)

(73) Assignees: Reco Technology (Chengdu) Co., Ltd., Sichuan (CN); Reco Biotek Co., Ltd., Miaoli County (TW)

( * ) Notice: Subject to any disclaimer, the term of this patent is extended or adjusted under 35 U.S.C. 154(b) by 0 days.

(21) Appl. No.: 17/168,197

(22) Filed: Feb. 5, 2021

(65) Prior Publication Data

US 2022/0138448 A1 May 5, 2022

(30) Foreign Application Priority Data

Oct. 30, 2020 (CN) .......................... 202011189579.2

(51) Int. Cl.
*G06V 40/13* (2022.01)
*B06B 1/06* (2006.01)
*G06F 3/043* (2006.01)

(52) U.S. Cl.
CPC ........ *G06V 40/1306* (2022.01); *B06B 1/0692* (2013.01); *G06F 3/043* (2013.01); *G06F 2203/04103* (2013.01)

(58) Field of Classification Search
CPC ........... G06V 40/1306; G06V 40/1318; G06V 40/12; G06F 3/043–0436; G06F 2203/04103; G06F 2203/04112; G06F 3/0412; G06F 3/0416; G06F 3/0445; B06B 1/0692; B06B 1/06–0696; H03H 3/00–10; H03H 9/00–76; H03H 2003/0071–0492; H03H 2009/0019–2442; H01L 41/29–297; H01L 41/311; H01L 41/31–39; H01L 40/0471; H06V 40/1306
See application file for complete search history.

(56) References Cited

U.S. PATENT DOCUMENTS

2014/0362000 A1* 12/2014 Seo ...................... G06F 3/04144
29/25.35
2019/0363241 A1* 11/2019 Huang ................ H01L 41/1132
2021/0260620 A1* 8/2021 Guo ....................... B06B 1/0629

FOREIGN PATENT DOCUMENTS

CN 111289022 A * 6/2020 ........... B06B 1/0215

* cited by examiner

*Primary Examiner* — Amr A Awad
*Assistant Examiner* — Aaron Midkiff
(74) *Attorney, Agent, or Firm* — CKC & Partners Co., LLC

(57) ABSTRACT

The disclosure provides a touch recognition device, including a display device and manufacturing method thereof. The touch recognition device includes a substrate, a thin film transistor layer, a transparent conductive layer, a first metal layer, a piezoelectric material layer and a second metal layer. The transparent conductive layer is disposed on an end of the thin film transistor layer, and the transparent conductive layer includes a plurality of transparent electrodes. The first metal layer is adjacent to the plurality of transparent electrodes. The piezoelectric material layer is disposed on the transparent conductive layer and the first metal layer. The second metal layer is disposed on the piezoelectric material layer to achieve the effect of increasing voltage of signals and power of ultrasound.

20 Claims, 7 Drawing Sheets

TOUCH RECOGNITION DEVICE, DISPLAY DEVICE AND MANUFACTURING METHOD THEREOF

CROSS-REFERENCE TO RELATED APPLICATION

This application claims priority to China Application Serial Number 202011189579.2, filed on Oct. 30, 2020, which is herein incorporated by reference in its entirety.

BACKGROUND

Field of Invention

The present disclosure relates to a touch recognition device, a display device and manufacturing method thereof. More particularly, the present disclosure relates to a touch recognition device, a display device and manufacturing method thereof having double metal layers.

Description of Related Art

In recent years, fingerprint identification has become one of the main biometric methods in the field of portable electronic devices. At present, the categories of fingerprint identification technology could be divided into capacitive touch control, resistive touch control, ultrasonic touch control and optical touch control. Among them, the features of ultrasonic touch control include low cost and simple hardware. In ultrasonic touch control, the characteristics of ultrasonic reflection are used to calculate the fingerprint pattern by receiving the ultrasonic reflection transmitted back from fingerprint ridges and fingerprint grooves.

However, because the panels all have certain thickness, the ultrasonic wave will have energy attenuation due to traveling through the medium in the transmission process. If the attenuation is too high, the identification results would be wrong. Therefore, how to increase the energy of the initial emitted ultrasonic wave, the present technology has yet to be solved.

SUMMARY

The problem to be solved of the present disclosure is to keep enough energy returned to the piezoelectric materials after the ultrasonic wave touches the finger and reflects. Some embodiments of the present disclosure provide a touch recognition device and a manufacturing method thereof to solve the aforementioned problem. The touch recognition device uses double metal layers to provide electrical signals, and generate resonance to enhance the signal of the identification element.

The present disclosure provides a touch recognition device, comprising a display device and manufacturing method thereof. The touch recognition device comprises a substrate, a thin film transistor layer, a transparent conductive layer, a first metal layer, a piezoelectric material layer and a second metal layer. The transparent conductive layer is disposed on an end of the thin film transistor layer, and the transparent conductive layer comprises a plurality of transparent electrodes. The first metal layer is adjacent to the plurality of transparent electrodes. The piezoelectric material layer is disposed on the transparent conductive layer and the first metal layer. The second metal layer is disposed on the piezoelectric material layer.

In some embodiments of the present disclosure, the first metal layer has a network structure surrounding the plurality of transparent electrodes.

In some embodiments of the present disclosure, these transparent electrodes are arranged in an array on the end of the thin film transistor layer.

In some embodiments of the present disclosure, the thickness of the network structure is from 500 Å to 10,000 Å.

In some embodiments of the present disclosure, these transparent electrodes are arranged in an array on the end of the thin film transistor layer.

In some embodiments of the present disclosure, the touch recognition device further includes a flexible printed circuit. The flexible printed circuit is disposed on an other end of the thin film transistor layer, and electrically connected with the second metal layer.

In some embodiments of the present disclosure, the touch recognition device further includes a conductive pad. The conductive pad is disposed on the thin film transistor, and electrically connecting the first metal layer with the flexible printed circuit.

In some embodiments of the present disclosure, the touch recognition device further includes a protective layer disposed between the first metal layer and the transparent conductive layer.

In some embodiments of the present disclosure, the touch recognition device further includes a dielectric layer disposed between the thin film transistor layer and the piezoelectric material layer.

In some embodiments of the present disclosure, the dielectric layer covers the transparent conductive layer and the first metal layer, and isolates the transparent conductive layer and the first metal layer from the second metal layer.

In some embodiments of the present disclosure, the material of the first metal layer and the second metal layer includes Mo/Al alloy, Mo, Mo/W alloy, Cu, Ni, Ag, Au, Ti, W, Co, Ru or a combination thereof.

The present disclosure provides a display device including the touch recognition device mentioned above.

The present disclosure provides a method of manufacturing a touch recognition device, including providing a substrate. Then a thin film transistor layer is formed on the substrate. A transparent conductive layer is formed on an end of the thin film transistor, in which the transparent conductive layer includes a plurality of transparent electrodes. A first metal layer is formed on the thin film transistor layer, in which the first metal layer is adjacent to the plurality of transparent electrodes. A piezoelectric material layer is formed on the transparent conductive layer and the first metal layer. A second metal layer is formed on the piezoelectric material layer.

In some embodiments of the present disclosure, the first metal layer has a network structure surrounding the plurality of transparent electrodes.

In some embodiments of the present disclosure, the plurality of transparent electrodes are arranged in an array on the end of the thin film transistor layer.

In some embodiments of the present disclosure, the thickness of the network structure is from 500 Å to 10,000 Å.

In some embodiments of the present disclosure, the method further includes forming a dielectric layer between the first metal layer and the piezoelectric material layer.

In some embodiments of the present disclosure, the step of forming the first metal layer on the thin film transistor layer includes forming the first metal layer and a conductive pad on the thin film transistor layer simultaneously. The conductive pad extends from the first metal layer, and electrically connects with the first metal layer.

In some embodiments of the present disclosure, the method further includes forming a flexible printed circuit on an other end of the thin film transistor layer. The flexible printed circuit is electrically connecting the conductive pad and the second metal layer.

It is to be understood that both the foregoing general description and the following detailed description are by examples, and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
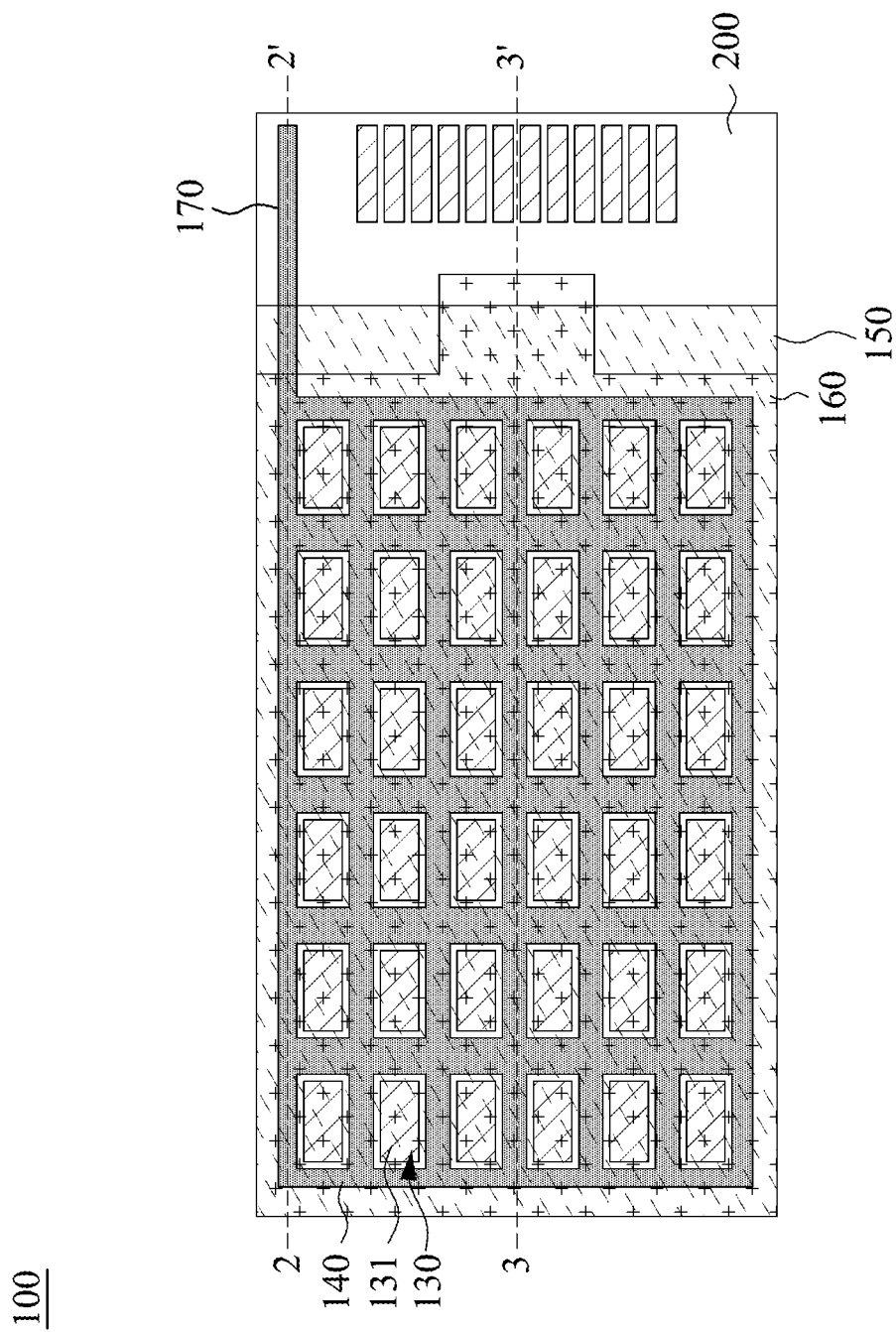
FIG. 1 is the schematic diagram of vertical view of the touch recognition device according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In general, the touch recognition device disclosed herein may be used in any display panel or touch panel-related device. In general, when there is only a single metal layer existed in the touch recognition device, the voltage provided by the signal transmitting terminal is about 170 V-180 V. Then, the generated ultrasonic wave can penetrate the glass cover plate of 550 μm. However, the present disclosure further disposes a second metal layer so that after the two metal layers input electrical signals to the piezoelectric material layer, the piezoelectric material resonates and outputs an ultrasonic wave which the energy of the ultrasonic wave is from 340 V to 380 V. Thus, the signals and ultrasonic wave output from the touch recognition device of the present disclosure can penetrate the glass cover plate or any panel from 560 μm to 1100 μm in thickness. Furthermore, the touch recognition device mentioned above can ensure that the reflected ultrasonic wave can penetrate the glass cover plate to the piezoelectric materials.

Figure 2:
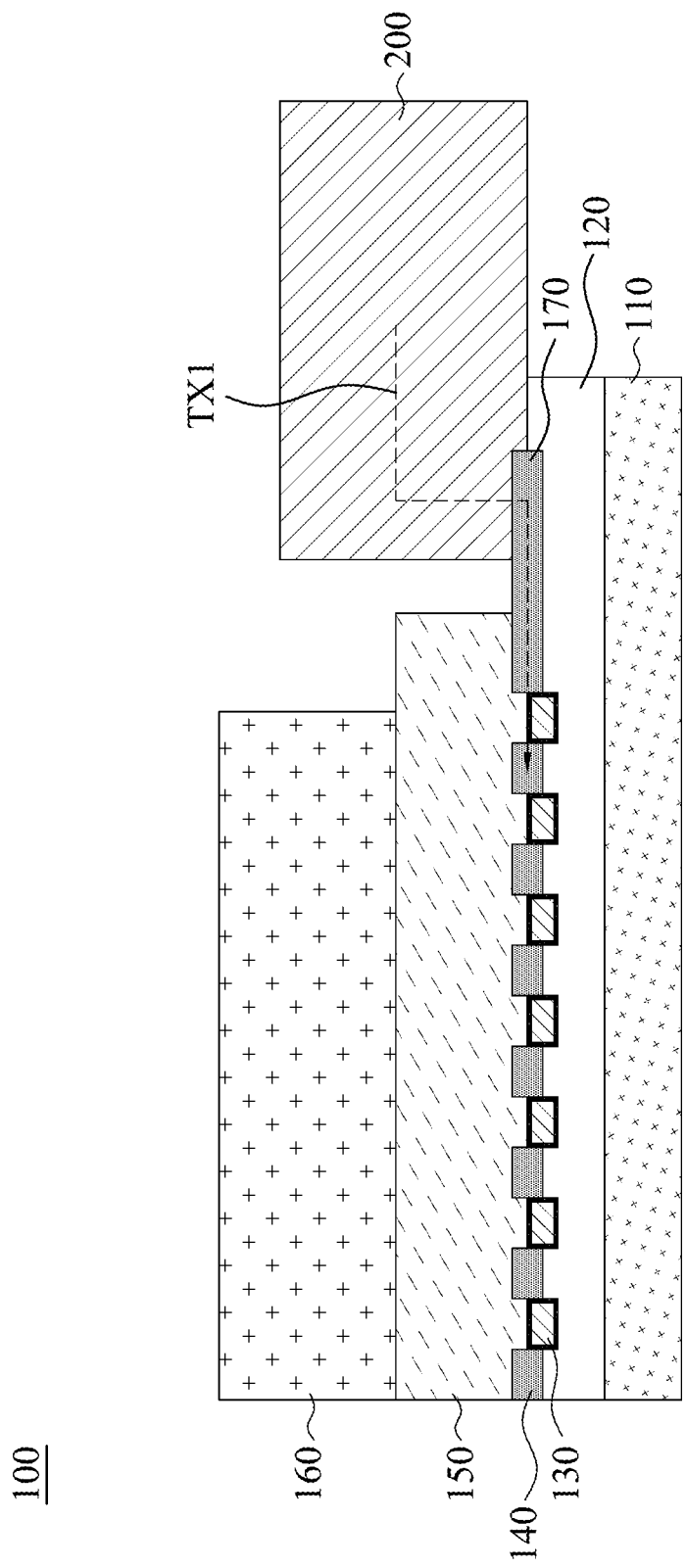
FIG. 2 is the cross-sectional diagram along line 2-2' of FIG. 1.
Figure 3:
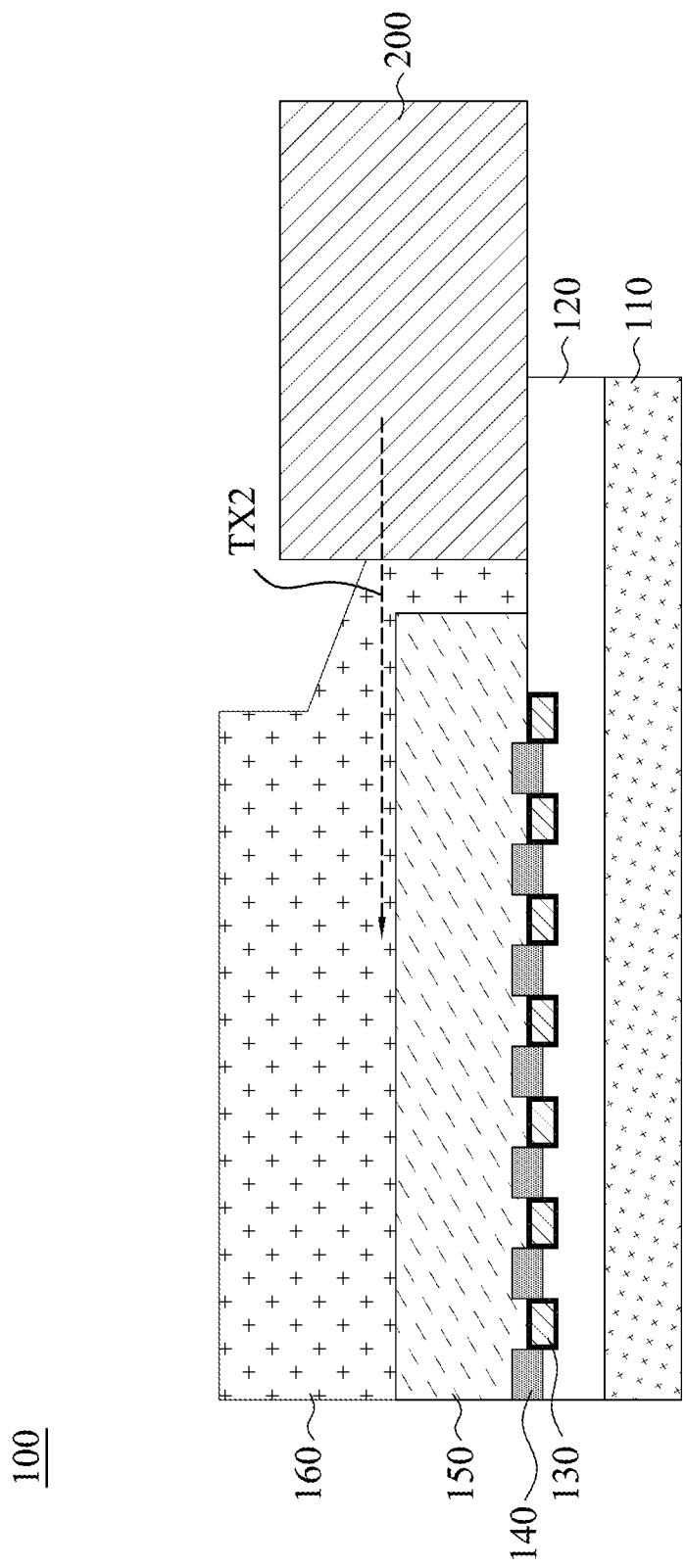
FIG. 3 is the cross-sectional diagram along line 3-3' of FIG. 1.

In some embodiments of the present disclosure, a touch recognition device 100 is provided. Referring to FIG. 1, FIG. 2 and FIG. 3, FIG. 1 is the schematic diagram of vertical view of the touch recognition device according to some embodiments of the present disclosure, in which the substrate 110 isn't shown in FIG. 1. FIG. 2 is the cross-sectional diagram along line 2-2' of FIG. 1. FIG. 3 is the cross-sectional diagram along line 3-3' of FIG. 1. The touch recognition device 100 comprises a substrate 110, a thin film transistor layer 120, a transparent conductive layer 130, a first metal layer 140, a piezoelectric material layer 150, a second metal layer 160 and a conductive pad 170.

Identically, the substrate 110 is a transparent substrate. In detail, the substrate 110 can be a hard transparent substrate or a flexible transparent substrate. The materials of the substrate 110 can be selected form glass, polymethylmethacrylate (PMMA), polyvinyl Chloride (PVC), polypropylene (PP), polyethylene terephthalate (PET), polyethylene naphthalate (PEN), polycarbonate (PC), polystyrene (PS) and other transparent materials.

Figure 4:
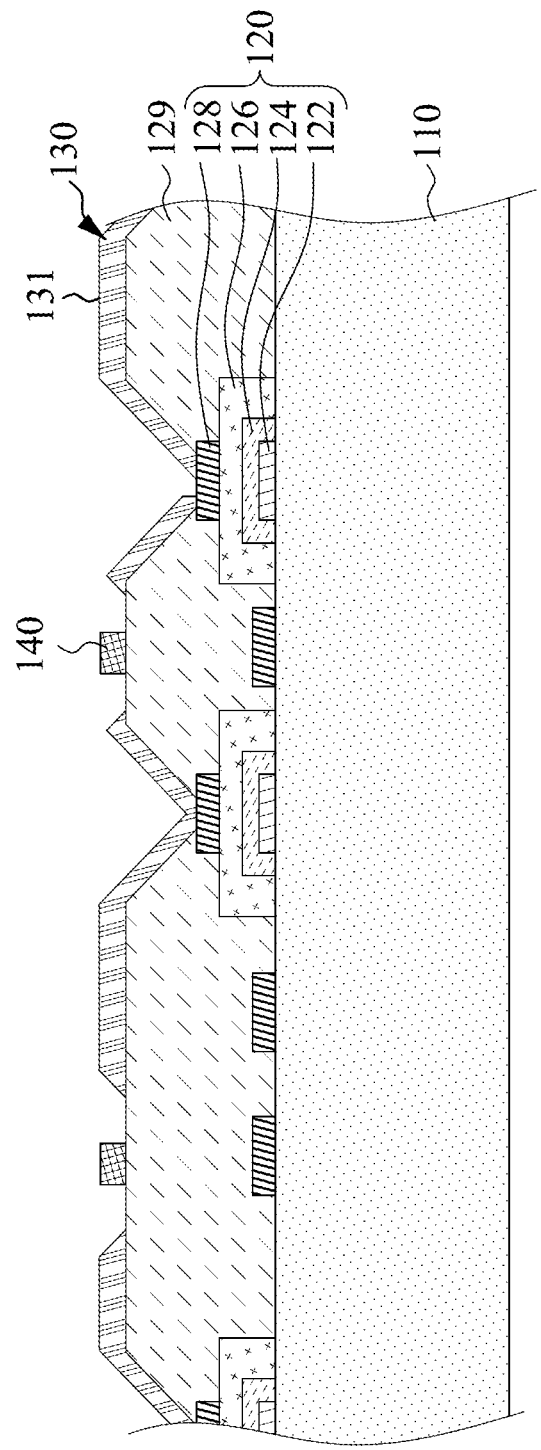
FIG. 4 is the detail cross-sectional diagram of the touch recognition device according to some embodiments of the present disclosure.

The thin film transistor layer 120 is formed on the substrate 110. Referring to FIG. 4, FIG. 4 is the detail cross-sectional diagram of the touch recognition device according to some embodiments of the present disclosure, in which the piezoelectric material layer 150, the second metal layer 160, the conductive pad 170 and the flexible printed circuit 200 are not shown in FIG. 4. Specifically, the thin film transistor layer 120 includes a gate electrode 122, a gate dielectric layer 124, an intermetallic dielectric layer 126 and a metal electrode 128. The gate electrode 122 is formed on the substrate 110. The gate dielectric layer 124 is formed on the gate electrode 122. The intermetallic dielectric layer 126 is formed on the gate dielectric layer 124. The metal electrode 128 is formed on the intermetallic dielectric layer 126. In some embodiments, materials of the gate electrode 122 can be silicon oxide or inorganic materials including but not limited to $SiO_2$, $Si_3N_4$, $HfO_2$, $Al_2O_3$, $Ta_2O_5$, $ZrO_2$, $TiO_2$ or the combination thereof. In some embodiments, materials of the gate electrode 122 and the metal electrode 128 includes but not limited to Mo—Al alloy, Mo, Mo—W alloy, Cu, Ni, Ag, Au, Ti, W, Co, Ru, other metal elements or the combination thereof.

As shown in FIG. 4, in some embodiments of the present disclosure, after the thin film transistor layer 120 is formed, a protective layer 129 would be directly deposited. The bottom of the protective layer 129 would fill the concave and convex structure formed by these transistors on the thin film transistor layer 120. Further, the bottom of the protective layer 129 could block the air contact and prevent physical collision, to prevent these transistor structures from scratches and oxidation. In which, materials of the protective layer 129 include but not limited to epoxy resin, acrylic resin, polymethyl methacrylate, polyimide, polycarbonate.

Referring back to FIG. 1, FIG. 2 and FIG. 3 again, the transparent conductive layer 130 is formed on an end of the thin film transistor layer 120. The transparent conductive layer 130 includes a plurality of transparent electrodes 131. In one embodiment, the transparent electrodes 131 could be composed of various transparent conductive materials, such as indium tin oxide (ITO), indium zinc oxide (IZO), cadmium tin oxide (CTO), aluminum-doped zinc oxide (AZO), indium tin zinc oxide (ITZO), tin oxide, zinc oxide, cadmium oxide, hafniumoxide (HfO), indium gallium zinc oxide (InGaZnO), indium gallium zinc magnesium oxide (InGaZnMgO), indium gallium magnesium oxide (InGaMgO), indium gallium oxide (InGaAlO), carbon nanotube (CNT), silver CNT or copper CNT or the combination thereof or the compositions of other transparent conductive material and metal or nonmetal.

The first metal layer 140 is formed adjacent to these transparent electrodes 131. In one embodiment, materials of the first metal layer 140 include but not limited to Mo—Al alloy, Mo, Mo—W alloy, Cu, Ni, Ag, Au, Ti, W, Co, Ru, other metal elements or the combination thereof. In one embodiment, the first metal layer 140 has a network structure, which surrounds these transparent electrodes 131.

In one embodiment of the present disclosure, as shown in FIG. 1, these transparent electrodes 131 are arranged in an array on the end of the thin film transistor layer 120. That is, these transparent electrodes 131 are arranged according to the position of the pixels. In some embodiments, the first metal layer 140 has network structure. The network structure of the first metal layer 140 enables the first metal layer 140 to be adjacent to these transparent electrodes 131. That is, these transparent electrodes 131 are surrounded by the first metal layer 140. In some embodiments, the first metal layer 140 lies approximately in the same plane as these transparent electrodes 131. In some embodiments, the thickness of the network structure is from 500 Å to 10,000 Å, meaning that the thickness of the first metal layer 140 is from 500 Å to 10,000 Å. In addition, the thickness of the first metal layer 140 should not be less than that of the transparent electrodes 131 to achieve better resonance effect and enhance the signal of touch recognition.

The piezoelectric material layer 150 is formed on the transparent conductive layer 130 and the first metal layer 140. In one embodiment, the gap between the first metal layer 140 and these transparent electrodes 131 is filled by the piezoelectric material layer 150. In one embodiment, the piezoelectric material layer 150 is composed of materials that can convert mechanical energy to electrical energy, such copolymer as polyvinylidene difluoride (PVDF), polyvinylidene fluoride-co-trifluoroethylene (PVDF-TrEE).

The second metal layer 160 is formed on the piezoelectric material layer 150. In one embodiment, materials of the second metal layer 160 include but not limited to Mo—Al alloy, Mo, Mo—W alloy, Cu, Ni, Ag, Au, Ti, W, Co, Ru, other metal elements or the combination thereof.

In one embodiment of the present disclosure, the piezoelectric material layer 150 covers the transparent conductive layer 130 and the first metal layer 140. Thus, the second metal layer 160 is isolated from the transparent conductive layer 130 and the first metal layer 140.

The conductive pad 170 extends from the first metal layer 140, and electrically connects with the first metal layer 140. In one embodiment, the materials of the conductive pad 170 include but not limited to Mo—Al alloy, Mo, Mo—W alloy, Cu, Ni, Ag, Au, Ti, W, Co, Ru, other metal elements or the combination thereof.

In some embodiments, the flexible printed circuit 200 is formed on another end of the thin film transistor layer 120. The first metal layer 140 electrically connects with the flexible printed circuit 200 through the conductive pad 170. The second metal layer 160 electrically connects with the flexible printed circuit 200 by direct contact.

Figure 5:
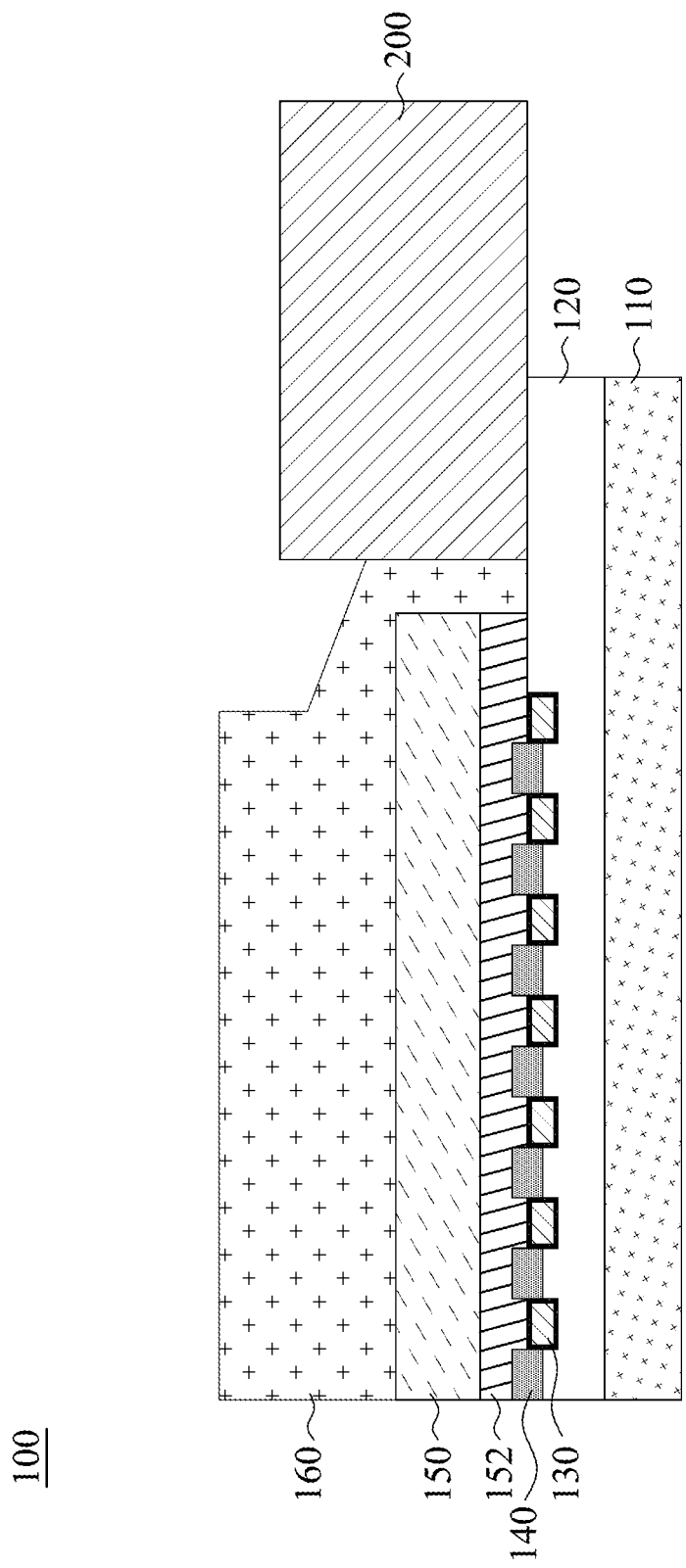
FIG. 5 is the cross-sectional diagram of the touch recognition device according to some embodiments of the present disclosure.

Referring to FIG. 5, FIG. 5 is the cross-sectional diagram of the touch recognition device according to some embodiments of the present disclosure. Between the transparent conductive layer 130, the first metal layer 140 and the piezoelectric material layer 150, the dielectric layer 152 or any insulating material could be disposed to protect the transparent conductive layer 130 and the first metal layer 140. In some embodiments, the dielectric layer 152 covers the transparent conductive layer 130 and the first metal layer 140, so that the second metal layer 160 does not contact the transparent conductive layer 130 and the first metal layer 140. In some embodiments, materials of the dielectric layer 152 includes but not limited to $SiO_2$, $Si_3N_4$, $HfO_2$, $Al_2O_3$, $Ta_2O_5$, $ZrO_2$, $TiO_2$ or the combination thereof.

Figure 6:
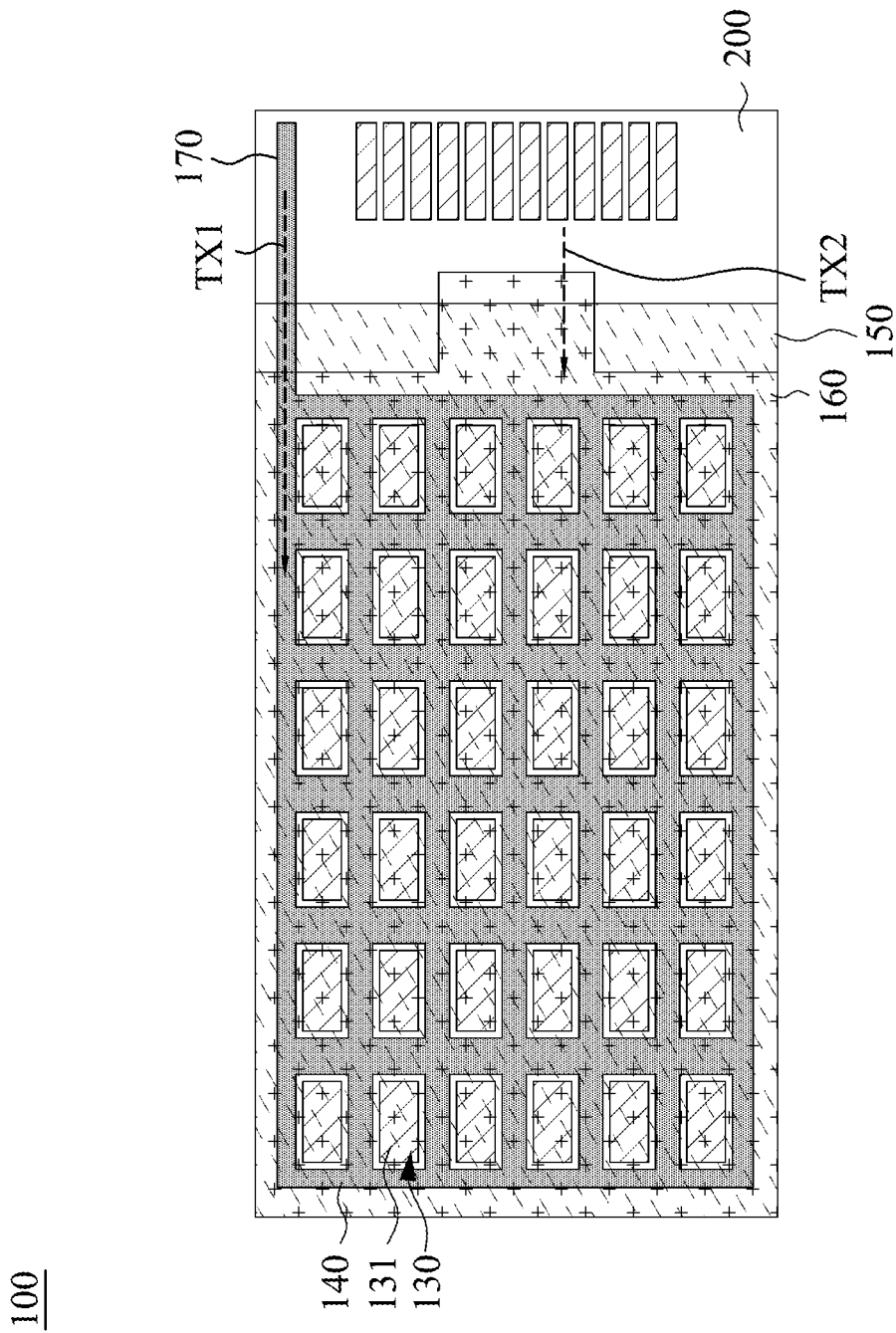
FIG. 6 is the electrical signal path based on the schematic diagram of vertical view of the touch recognition device of FIG. 1.

In some embodiments, the transmission of the electrical signals are shown in FIG. 2, FIG. 3 and FIG. 6. FIG. 6 is the electrical signal path based on the schematic diagram of vertical view of the touch recognition device of FIG. 1. The flexible printed circuit 200 inputs the electrical signal TX1 to the first metal layer 140 through the conductive pad 170. The flexible printed circuit 200 inputs the electrical signal TX2 to the second metal layer 160 by direct contact.

Figure 7:
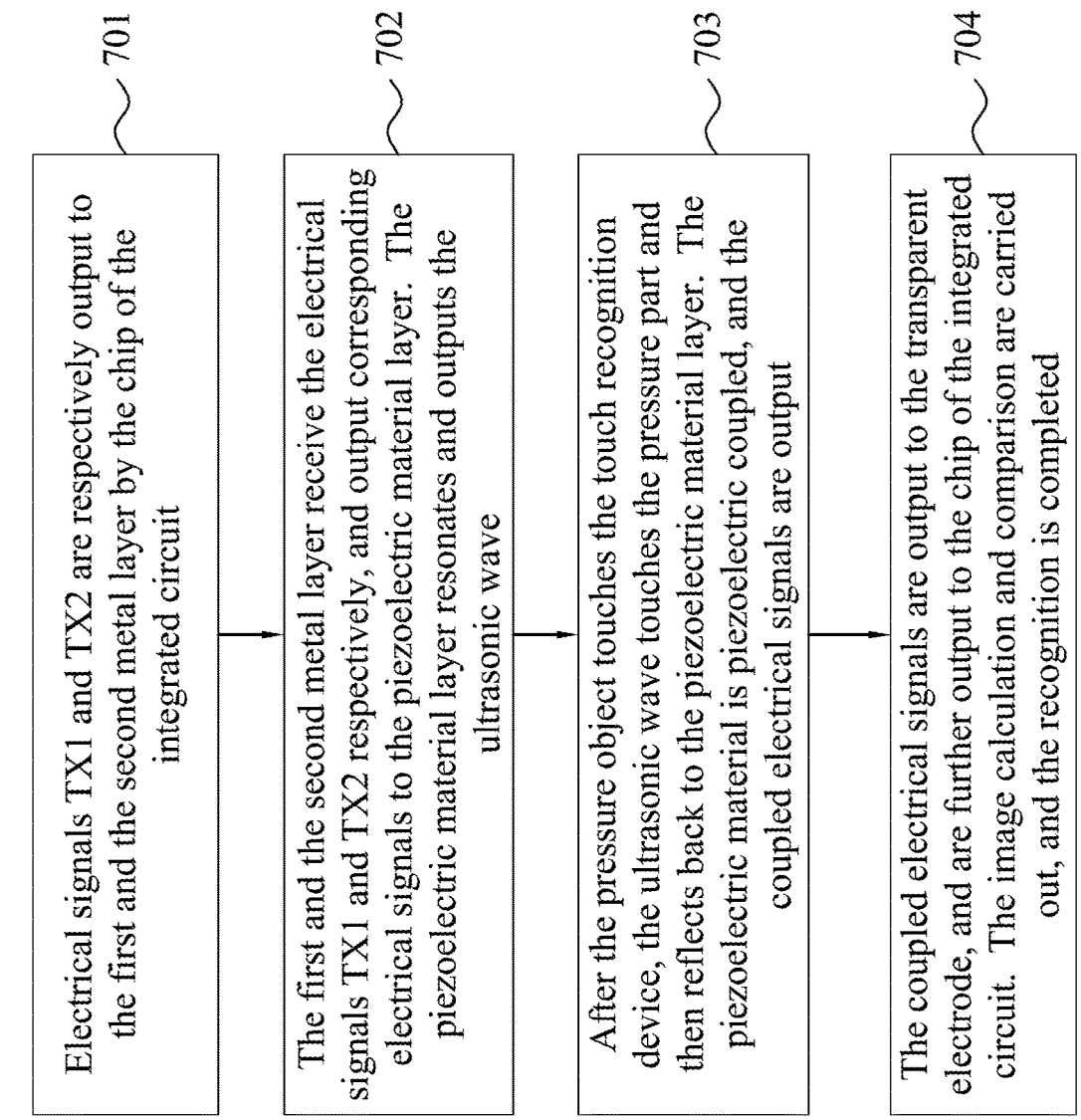
FIG. 7 is the recognition process diagram of the touch recognition device according to some embodiments of the present disclosure.

Referring to FIG. 6 and FIG. 7 simultaneously, in which FIG. 7 is the recognition process diagram 700 of the touch recognition device according to some embodiments of the present disclosure. As mentioned in step 701, the chip of the integrated circuit (not shown in FIG. 1 to FIG. 6) in the flexible printed circuit 200 inputs the electrical signal TX1 to the first metal layer 140 through the conductive pad 170 electrically connecting with the flexible printed circuit 200. The second metal layer 160 is in direct contact with the flexible printed circuit 200, and electrically connects with the flexible printed circuit 200. Thus, the chip of the integrated circuit directly inputs the electrical signal TX2 to the second metal layer 160 from the flexible printed circuit 200.

Referring to step 702, after the first metal layer 140 and the second metal layer 160 receive the electrical signals TX1 and TX2 respectively, the electrical signals TX1 and TX2 are input to the piezoelectric material layer 150 immediately. When the piezoelectric material layer 150 receiving the electrical signals TX1 and TX2, the piezoelectric material layer 150 would deform due to the characteristics of the piezoelectric material. In addition, when the electrical signals TX1 and TX2 are alternating current (AC) of a specific frequency, the piezoelectric material layer 150 would vibrate and emit ultrasonic wave with a frequency greater than 20000 Hz. And, compared with traditional single signal or single power supply, because the piezoelectric material layer 150 receives two electrical signals, which are the electrical signals TX1 and TX2, thus the piezoelectric material layer 150 further generates the double-layer resonance. That is, the first metal layer 140 resonates with the transparent conductive layer 130, and the first metal layer 140 also resonates with the second metal layer 160, forming the double-layer resonance. After resonance, a higher energy ultrasonic wave is generated from the piezoelectric material layer 150, and the reflected ultrasonic wave in the subsequent steps could be maintained at certain energy. Thus, the energy of the reflected ultrasonic wave could be maintained after penetrating other layers to eliminate the possibility of bad signal.

Referring to step 703, when a pressure object (such as a finger) touches the touch recognition device of the present disclosure, the resonated ultrasonic wave touches the surface of the pressure object immediately (such as the ridges and grooves of a fingerprint). The different patterns of the surface of the pressure object reflect the ultrasonic wave back to the piezoelectric material layer 150. Piezoelectric material layer 150 receives the reflected ultrasonic wave and then carries out piezoelectric coupling, which converts the reflected ultrasonic wave into a coupled electrical signal (no shown).

Referring to step 704, after the coupled electrical signal is input to these transparent electrodes 131 of the transparent conductive layer 130, these transparent electrodes 131 would transmit the coupled electrical signal back to the chip of the integrated circuit. The chip of the integrated circuit converts the coupled electrical signal into a grayscale image of the fingerprint, and outputs the grayscale image to the calculus system (not shown). After the calculus system calculates and compares the grayscale image, the recognition process as shown in FIG. 7 is completed.

As mentioned above, the feature of the present disclosure is simultaneously providing two electrical signals, i.e., the electrical signals TX1 and TX2 are provided to the piezoelectric material layer 150 to make the piezoelectric material layer 150 resonate. Compared with single electrical signal, such resonance can produce ultrasonic wave with higher energy and penetrate thicker glass cover plate or other panels. Much further, the reflected ultrasonic wave could maintain certain energy during transmission to avoid bad signal.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A touch recognition device, comprising:
a substrate;
a thin film transistor layer, disposed on the substrate;
a transparent conductive layer, directly disposed on a surface of the thin film transistor layer and on an end of the thin film transistor layer, and the transparent conductive layer comprising a plurality of transparent electrodes;
a first metal layer, directly disposed on the surface of the thin film transistor layer and adjacent to the plurality of transparent electrodes, wherein the first metal layer is configured to receive a first electrical signal such that the transparent conductive layer resonates with the first metal layer;
a piezoelectric material layer, disposed on the transparent conductive layer and the first metal layer; and
a second metal layer, disposed on the piezoelectric material layer, wherein the second metal layer is configured to receive a second electrical signal such that the second metal layer resonates with the first metal layer.

2. The touch recognition device of claim 1, wherein the first metal layer has a network structure surrounding the plurality of transparent electrodes.

3. The touch recognition device of claim 2, wherein the plurality of transparent electrodes are arranged in an array on the end of the thin film transistor layer.

4. The touch recognition device of claim 2, wherein a thickness of the network structure is from 500 Å to 10,000 Å.

5. The touch recognition device of claim 1, wherein the plurality of transparent electrodes are arranged in an array on the end of the thin film transistor layer.

6. The touch recognition device of claim 1, further comprising a flexible printed circuit, disposed on an other end of the thin film transistor layer, and electrically connected with the second metal layer.

7. The touch recognition device of claim 6, further comprising a conductive pad, disposed on the thin film transistor layer, and electrically connecting the first metal layer with the flexible printed circuit.

8. The touch recognition device of claim 1, further comprising a protective layer, disposed between the thin film transistor layer and the transparent conductive layer.

9. The touch recognition device of claim 1, further comprising a dielectric layer, disposed between the first metal layer and the piezoelectric material layer.

10. The touch recognition device of claim 9, wherein the dielectric layer covers the transparent conductive layer and the first metal layer, and isolates the transparent conductive layer and the first metal layer from the second metal layer.

11. The touch recognition device of claim 1, wherein the material of the first metal layer and the second metal layer comprises Mo/Al alloy, Mo, Mo/W alloy, Cu, Ni, Ag, Au, Ti, W, Co, Ru or a combination thereof.

12. A display device, comprising the touch recognition device of claim 1.

13. A method of manufacturing a touch recognition device, comprising following steps:
providing a substrate;
forming a thin film transistor layer on the substrate;
forming a transparent conductive layer directly on a surface of the thin film transistor layer and on an end of the thin film transistor layer, wherein the transparent conductive layer comprises a plurality of transparent electrodes;
forming a first metal layer directly on the surface of the thin film transistor layer, wherein the first metal layer is adjacent to the plurality of transparent electrodes, wherein the first metal layer is configured to receive a first electrical signal such that the transparent conductive layer resonates with the first metal layer;
forming a piezoelectric material layer on the transparent conductive layer and the first metal layer; and
forming a second metal layer on the piezoelectric material layer, wherein the second metal layer is configured to receive a second electrical signal such that the second metal layer resonates with the first metal layer.

14. The method of claim 13, wherein the first metal layer has a network structure surrounding the plurality of transparent electrodes.

15. The method of claim 14, wherein the plurality of transparent electrodes are arranged in an array on the end of the thin film transistor layer.

16. The method of claim 14, a thickness of the network structure is from 500 Å to 10,000 Å.

17. The method of claim 13, further comprising forming a dielectric layer between the first metal layer and the piezoelectric material layer.

18. The method of claim 13, wherein the plurality of transparent electrodes are arranged in an array on the end of the thin film transistor layer.

19. The method of claim 13, wherein the step of forming the first metal layer on the thin film transistor layer comprises forming the first metal layer and a conductive pad on the thin film transistor layer simultaneously, wherein the conductive pad extends from the first metal layer, and electrically connects with the first metal layer.

20. The method of claim 19, further comprising forming a flexible printed circuit on an other end of the thin film transistor layer, and the flexible printed circuit being electrically connecting the conductive pad and the second metal layer.

* * * * *